United States Patent Office 2,868,800
Patented Jan. 13, 1959

2,868,800

6-ETHOXYBENZOTHIAZOLE-2-SULFONAMIDE

Jerome Korman, Kalamazoo Township, Kalamazoo County, Mich., assignor to The Upjohn Company, Kalamazoo, Mich., a corporation of Michigan No Drawing. Application October 13, 1954
Serial No. 462,113

1 Claim. (Cl. 260—306.6)

This invention relates to a new compound, 6-ethoxybenzothiazole-2-sulfonamide, having the following structural formula:

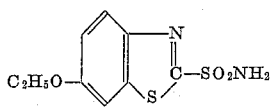

In the preparation of the novel compound of the invention 6-ethoxybenzothiazole-2-thiol is first converted to the corresponding sulfenamide by oxidative condensation with an amide-forming nitrogen compound which can be carried out in one step [see Carr, Smith, and Alliger, J. Org. Chem. 14: 921–34 (1949); Tschunkur and Kohler, U. S. Patent 2,045,888; Ashworth, U. S. Patent 2,268,467; Carr, U. S. Patent 2,271,834; and Harman, U. S. Patents 2,191,656–7], or in two steps via an N-chloroamine [see Hanslick, U. S. Patent 2,261,024; British Patent 377,730; and Alliger, U. S. Patents 2,495,085 and 2,581,921], or in two steps via the disulfide [see Busch, Ber. 29: 2127 (1896); Tschunkur and Kohler, U. S. Patent 2,045,888]. The 6-ethoxybenzothiazole-2-sulfenamide thus obtained is then treated with a strong oxidizing agent to convert it to 6-ethoxybenzothiazole-2-sulfonamide. The oxidizing agent, advantageously aqueous potassium permanganate, is added gradually with stirring and with cooling, if desired, advantageously to a solution of the sulfenamide in an inert solvent such as acetone, pyridine, dioxane, and like polar solvents such as commonly are used as media for permanganate oxidations. Other strong oxidizing agents of an alkaline character, that is, which are either effective in an alkaline solution or produce in the oxidation an alkaline component, can be used. Alkaline hydrogen peroxide and sodium peroxide, for example, could be used in place of potassium permanganate. Acidic oxidations using hydrogen peroxide in acetic acid, chromic acid, nitric acid, permanganic acid, and the like, can be used. The oxidizing agent advantageously can be dissolved in a solvent (water, for example, is suitable for potassium permanganate) and the solution slowly added to the sulfenamide solution. If the rate of addition is properly adjusted, excessive heating will be avoided. Ordinarily it will be sufficient if the rate of addition of the oxidizing agent is so correlated with the capacity of the apparatus to dissipate heat as to keep the temperature below the decomposition temperature for either the sulfenamide used or the sulfonamide produced in the reaction mixture, whichever is the lower. As this temperature will vary according to the decomposition temperature of the compounds involved, no hard and fast rule can be given, but, in general, it will be sufficient if the temperature is kept below about sixty degrees centigrade. Any lower reactive temperature can be used. At lower temperatures, however, the rate of reaction is reduced so that it is ordinarily desirable not to operate at temperatures below about minus five degrees centigrade. Ordinarily a temperature between about zero and about fifty degrees centigrade is suitable. When the reaction is complete, the desired sulfonamide, after acidification to free it from its salt, if such is formed, can then be recovered in any suitable manner, as by filtration, centrifugation, solvent extraction, or the like, and can, if desired, be purified by recrystallization from a solvent.

When ammonia is used the unsubstituted amide is obtained. By substituting methylamine for ammonia, the corresponding N-methyl sulfonamide is obtained. In the like, manner, by substituting secondary amines and other primary amines in the above reactions, there are also obtained the corresponding N,N-dimethyl, N-n-butyl, N-isobutyl, N-sec-butyl, N-tert-butyl, N,N-diisopropyl, N-methyl-N-ethyl, N-2-aminoethyl, N-(2-ethylhexyl), N-cyclohexyl, N-methyl-N-cyclohexyl, N-2-methylcyclohexyl, N-cyclopentyl, and like N-mono- and N-di-loweralkyl and cycloalkyl sulfonamides; N-2-pyridyl, N-2-thiazolyl, N-2-pyrimidyl, and like N-heterocyclic sulfonamides; and N-phenyl, N-methyl-N-phenyl, N-2-thienyl, N-thenyl, N-2-furyl, N-furfuryl, N-tolyl, N-benzyl, N-phenethyl, and like N-aryl and N-aralkyl sulfonamides. Also by substituting the ammonia by a heterocyclic secondary amine such as piperidine, pyrrolidine, piperazine, N-methylpiperazine, morpholine, and the like, as well as the lower-alkyl derivatives thereof, such as 2-methylpiperidine, 2,2-dimethylpyrrolidine, and the like, there are obtained the corresponding sulfonamides in which the amide nitrogen is comprised in a heterocycle. Thus, the radical $NH_2$ in the above formulas can be replaced by the radical $—NR'R''$ in which R' and R'', representatively, can be any amido group. Representatively R' and R'' are hydrogen, alkyl, cycloalkyl, aryl, aralkyl, heterocyclic groups, or comprised in heterocyclic groups.

The invention may be more fully understood by reference to the following examples which are illustrative only and not intended to be limiting.

EXAMPLE 1

A. 6-ethoxybenzothiazole-2-sulfenamide

A solution prepared by dissolving 21.0 grams (0.1 mole) of 6-ethoxybenzothiazole-2-thiol [Sebrell and Boord, J. Am. Chem. Soc. 45: 2390–9 (1923)], in 75 milliliters of water containing five grams of sodium hydroxide, and 75 milliliters of ten percent sodium hypochlorite solution were added simultaneously to 300 milliliters of concentrated ammonium hydroxide which was cooled to zero degrees centigrade, and vigorously stirred. During the addition the temperature was not allowed to rise above five degrees centigrade. The resulting solid was recovered by filtration, washed thoroughly with water, and dried at room temperature under reduced pressure. There was obtained 21 grams of 6-ethoxybenzothiazole-2-sulfenamide melting at 132 to 155 degrees centigrade (decomposition). Recrystallization from ethyl acetate gave a product melting at 140.5–143 degrees centigrade (decomposition).

*Analysis.*—Calculated: C, 47.76; H, 4.45; N, 12.38; S, 28.33. Found: C, 47.76; H, 4.44; N, 12.26; S, 28.59.

The sulfenamide thus produced is useful as an accelerator in the vulcanization of rubber or as an intermediate for the preparation of the corresponding sulfonamide in accordance with the following:

B. 6-ethoxybenzothiazole-2-sulfonamide

A solution of 3.39 grams (0.015 mole) of the sulfenamide of Example 1A in 100 milliliters of acetone was treated dropwise, with stirring, with a solution of 3.5 grams of potassium permanganate in 100 milliliters of water. The temperature rose to 42 degrees centigrade. After stirring an additional ten minutes the reaction mixture was filtered to remove manganese dioxide, the latter was washed with 100 milliliters of warm water, and the combined filtrates were concentrated under reduced pressure to remove acetone. The residual solution was treated with charcoal, filtered, and acidified with concentrated hydrochloric acid. After standing in the refrigerator for four hours the solid sulfonamide was recovered by filtration, washed with water, and dried. There was obtained 2.37 grams of 6-ethoxybenzothiazole-2-sulfonamide melting at 180–190 degrees centigrade. Recrystallization from ethyl acetate-Skellysolve B gave 1.25 grams of material melting at 188–190.5 degrees centigrade.

*Analysis.*—Calculated: C, 41.85; H, 3.90; N, 10.85; S, 24.82. Found: C, 42.29; H, 3.86; N, 10.72; S, 24.74.

The sulfonamide thus produced is useful as a diuretic and for this purpose can be administered orally in doses of from five to 25 milligrams per kilo.

It is to be understood that the invention is not to be limited to the exact details of operation or exact compounds shown and described, as obvious modifications and equivalents will be apparent to one skilled in the art, and the invention is therefore to be limited only by the scope of the appended claim.

I claim:

6-ethoxybenzothiazole-2-sulfonamide.

References Cited in the file of this patent

UNITED STATES PATENTS

| 2,018,813 | Schubert et al. | Oct. 29, 1935 |
| 2,331,749 | Watt | Oct. 12, 1943 |
| 2,476,655 | Fox et al. | July 19, 1949 |
| 2,495,085 | Alliger | Jan. 17, 1950 |
| 2,581,932 | Smith | Jan. 8, 1952 |
| 2,585,155 | Mingasson | Feb. 12, 1952 |
| 2,595,334 | Clapp et al. | May 6, 1952 |

FOREIGN PATENTS

| 502,319 | Belgium | Apr. 30, 1951 |
| 615,580 | Germany | July 8, 1935 |
| 575,074 | Great Britain | Feb. 1, 1946 |
| 642,597 | Great Britain | Sept. 6, 1950 |

OTHER REFERENCES

Stewart et al.: J. Org. Chem. 14, 1111–1117 (1949).

Northy: Sulfonamides and Allied Compounds (1948), Reinhold Pub. Co., New York, N. Y., pages 324, 334, 335.

UNITED STATES PATENT OFFICE
CERTIFICATE OF CORRECTION

Patent No. 2,868,800 January 13, 1959

Jerome Korman

It is hereby certified that error appears in the printed specification of the above numbered patent requiring correction and that the said Letters Patent should read as corrected below.

Column 2, lines 29 to 31, for "representatively, can be any amido group. Representatively R' and R" are hydrogen," read — representatively, are hydrogen, —.

Signed and sealed this 28th day of July 1959.

(SEAL)
Attest:

KARL H. AXLINE
Attesting Officer

ROBERT C. WATSON
Commissioner of Patents